July 8, 1969  J. L. NASH  3,454,126
AUTOMATIC SAFETY PARKING BRAKES
Filed May 29, 1967
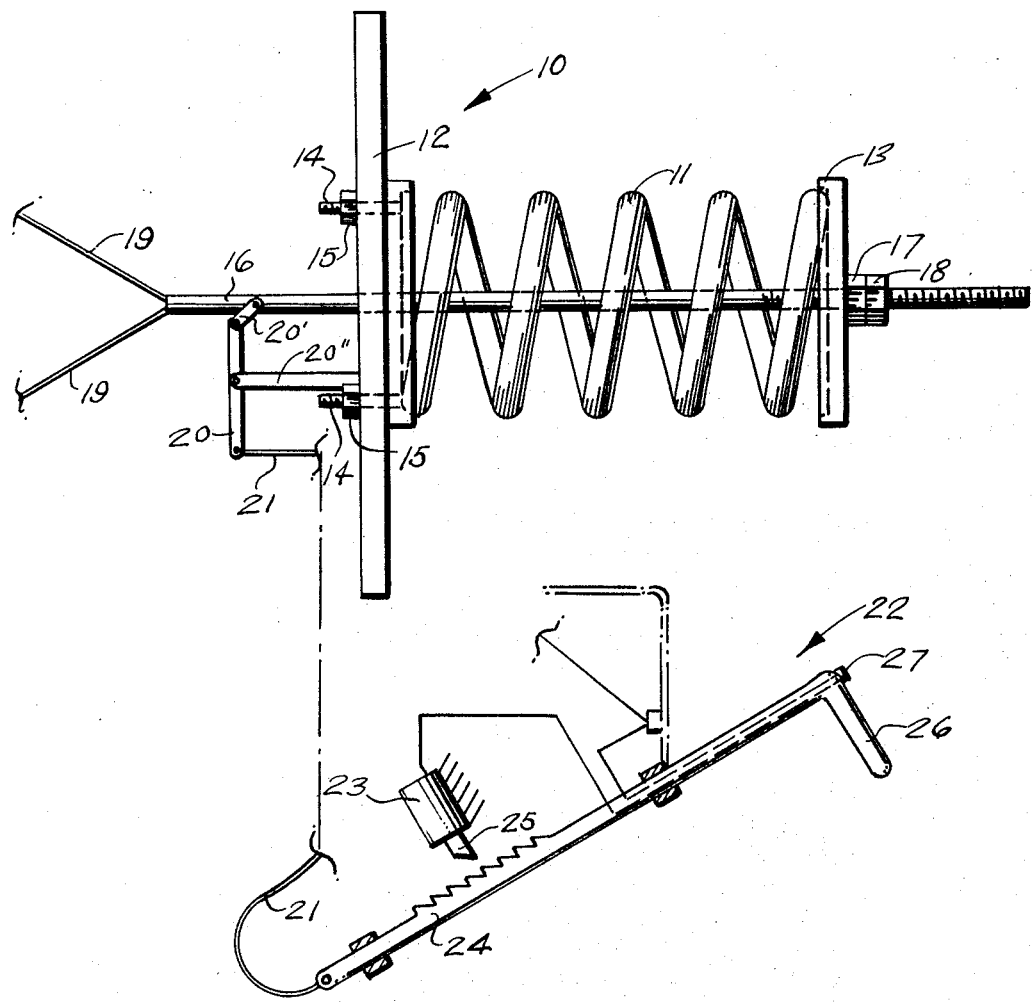
INVENTOR.
*John L. Nash*

United States Patent Office 3,454,126
Patented July 8, 1969

3,454,126
AUTOMATIC SAFETY PARKING BRAKES
John L. Nash, P.O. Box 194,
Redding, Calif. 96001
Filed May 29, 1967, Ser. No. 641,924
Int. Cl. B60k *27/00, 33/00;* B60r *19/00*
U.S. Cl. 180—82      1 Claim

ABSTRACT OF THE DISCLOSURE

A safety device incorporating a hand brake applying spring to automatically set the hand brake upon release of an ignition switch controlled latch when the ignition switch is turned to an "off" position.

---

This invention relates to vehicle parking brake systems, and more particularly to an improved parking brake.

It is therefore the main purpose of this invention to provide an automatic safety parking brake for motor vehicles which will prevent a person from turning the automobile engine off and leaving it without setting the parking brakes.

Another object of this invention is to provide an automatic safety parking brake which will serve to prevent small children from releasing the parking brake lever and causing runaway accidents. Since considerable tension is applied against the brake lever, pull thereon will require a substantial force to overcome such tension thereby making it less likely for the children to release the brake. Furthermore release of the lever and the coil spring will once again set the brake.

Other objects and advantages of the invention will become apparent with a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention.

In the drawing:

The drawing is the sole view of the present invention.

According to this invention, an automatic safety parking brake 10 is provided with a coil spring 11 which is set between a pair of steel plates 12 and 13 (having sufficient strength to apply the parking brake), fastened to the under side of the automobile frame with bolts 14 and nuts 15. An elongated rod 16 running through the center of the coil 11 is threaded on one end to accommodate an adjusting nut 17 and a lock-nut 18 for the purpose of adjusting the amount of tension needed to apply the parking brakes. The cables 19 or suitable rods extending to the parking brakes are attached to the opposite end of the center or tension rod 16. Fastened to the tension rod 16 is a moveable lever 20 which is pivotally secured to a shackle 20'. The lever 20 is pivoted intermediate its ends to one end of a rigid bar or fulcrum post 20'', the other end of the bar or post being fast to the frame or steel plate 12. As previously stated, one end of the lever 20 is pivotally secured to the shackles 20' which, in turn, is pivoted to the bar 16. The other or free end of lever 20 is fastened to an enclosed cable 21 that extends to the hand-release assembly 22 located inside the vehicle (not shown).

The inside assembly consists of a solenoid 23 which is set in such a position to ratchet teeth 24 so that when the ignition is in the "on" position, the pawl 25 of solenoid 23 is projected therefrom and engages the ratchet teeth 24, so that when the hand lever 26 is pulled out, it will remain out releasing the parking brakes spring until the ignition switch is turned to "off" position, or the cutout switch 27 in the release handle 26 is moved manually to allow the spring (not shown) in the solenoid 23 to retract the pawl 25 and disengage the ratchet teeth 24, thus letting the hand lever 26 in and allowing the coil spring 11 under the vehicle to apply the parking brake.

It will be noted that, since the cutout switch 27 is disposed between and in series connection with the ignition switch and solenoid, the switch 27 may also be used to set the parking brake when it is desired to apply the parking brakes and leave the engine running in order to work on the vehicle.

What I now claim is:

1. In an automatic safety parking brake system for an automotive vehicle having a manually operated slidable parking brake lever and an ignition switch, the combination of a compression coil spring between end plates at its opposite ends, one said end plate secured to a frame of said vehicle, a central rod extending through said plates and said spring, said rod being threaded at one end and engaging an adjusting nut and locknut positioned against the other said plate for adjustably compressing said coil spring, the opposite end of said rod having one end of a plurality of cables secured thereto, the cables extending to parking brakes of said vehicle, said opposite end portion of said rod being connected by a shackle to one end of a pivotable lever centrally pivotable about a fulcrum post secured on said one of said end plates, the opposite end of said lever being connected to a control cable secured to said manually operated slidable parking brake lever, said parking brake lever having a toothed rack comprised of teeth selectively engageable by a pawl movable by a solenoid between an engaged and disengaged position, said solenoid being in an electrical circuit incorporating said ignition switch of said vehicle and an automatically operative cutoff switch on said parking brake lever, in the vicinity where said brake lever is manually grasped and disposed between and in series connection with said solenoid and said ignition switch whereby actuation of said cutoff switch deenergizes said solenoid thereby retracting said pawl.

References Cited

UNITED STATES PATENTS 2,248,747    7/1941    Dick.
2,968,378    1/1961    Yanda.
3,119,477    1/1964    Ryder.

A. HARRY LEVY, *Primary Examiner.*

U.S. Cl. X.R.

192—1